United States Patent
Merz et al.

(10) Patent No.: US 6,246,776 B1
(45) Date of Patent: Jun. 12, 2001

(54) IMAGE RECORDING MEDIA DETERMINATION SYSTEM, APPARATUS AND METHOD FOR AN IMAGE PROCESSING DEVICE

(75) Inventors: Eric A. Merz, Webster; Kamal G. Escalona, Rochester; Charles M. Gardiner, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/233,109

(22) Filed: Jan. 19, 1999

(51) Int. Cl.[7] .................................................. G06K 9/00
(52) U.S. Cl. ................................... 382/100; 358/296
(58) Field of Search ....................... 382/100; 106/31.32; 353/26; 355/202; 358/448, 296; 428/76; 399/389; 347/106

(56) References Cited

U.S. PATENT DOCUMENTS

| | | | |
|---|---|---|---|
| 4,174,891 | * 11/1979 | Flint et al. | 353/26 |
| 5,162,141 | * 11/1992 | Davey et al. | 428/76 |
| 5,172,162 | * 12/1992 | Taneda | 355/202 |
| 5,513,013 | * 4/1996 | Kuo | 358/448 |
| 5,922,115 | * 7/1999 | Sano et al. | 106/31.32 |

* cited by examiner

*Primary Examiner*—Joseph Mancuso
*Assistant Examiner*—Abolfazl Tabatabai
(74) *Attorney, Agent, or Firm*—Oliff & Berridge, PLC (57) ABSTRACT

An image recording media determination system is used with an imaging processing device and is operative for determining whether to form an image on a sheet of image recording media that is fed from a media source. The image recording media determination system includes a determination device and a controller device. The determination device determines whether the sheet of image recording media is compatible with the image processing device. The controller device which is in communication with the determination device permits forming the image on the sheet of image recording material by the image processing device when the determination device determines that the sheet of image recording media is compatible with the image processing device. The controller device also prohibits forming the image on the sheet of image recording media by the image processing device when the determination device determines that the sheet of image recording media is incompatible with the image processing device. A method for practicing the invention is also described.

20 Claims, 10 Drawing Sheets

| TYPE OF TRANSPARENT SHEET | CODE |
|---|---|
| A | 0101 |
| B | 0100 |
| . | . |
| . | . |
| . | . |

IMAGE RECORDING MEDIA DETERMINATION SYSTEM, APPARATUS AND METHOD FOR AN IMAGE PROCESSING DEVICE

BACKGROUND OF THE INVENTION

1. Field of Invention

The invention relates to image recording media determination systems and methods. More particularly, the invention is directed to image recording media determination systems and methods that determine whether the image recording media is compatible with an image processing device before an image is formed on the image recording media.

2. Description of Related Art

Many different types of image processing devices are available in the marketplace. Such image processing devices include laser printers, xerographic photocopiers, dye sublimation printers and various types of ink jet printers. Each of these image processing devices is sufficiently versatile for forming images on various image recording media. For example, the image recording media can be various colors, sizes and even types. Also, the types of image recording media are fabricated from a variety of materials. Typically, paper as well as transparencies are used in these image processing devices so that a desired image can be recorded on the image recording medium.

More sophisticated image processing devices include a sensing capability to determine whether the image recording media is either a sheet of paper or a transparency. With this information, the image processing device optimizes its performance characteristics in order to form the most appropriate image on that specific type of image recording medium.

Unfortunately, a thermal ink jet printer, for example, might require a specific type of transparency upon which to form an image that is different from a type of transparency optimally usable with a laser printer. In fact, transparencies used in some types of ink jet printers must be treated with a special surface coating so that the desired image can be formed. These transparencies used for inkjet printers do not appear to be different than typical transparencies. Thus, it is easy for an operator of the ink jet printer to mistakenly use a transparency that is incompatible with the ink jet printer.

Using an incompatible transparency with the ink jet printer results in contamination of the internal working components with wet ink. If such a mishap occurs, the ink jet printer must be disassembled and cleaned before it can be used again. Otherwise, the contaminated working components will smudge subsequent image recording media with ink. Also, the operator might soil his/her hands with the ink smudged on the subsequently-fed media.

SUMMARY OF THE INVENTION

Image recording media determination systems and methods of the invention are used with an imaging processing device that is operative for forming an image on a sheet of image recording media. One exemplary embodiment of an image recording media determination system according to this invention includes a determination device and a control device. The determination device determines whether the sheet of image recording media is compatible with the image processing device. The control device permits forming the image on the sheet of image recording media by the image processing device when the determination device determines that the sheet of image recording media is compatible with the image processing device. Also, the control device prohibits forming the image on the sheet of image recording media by the image processing device when the determination device determines that the sheet of image recording material is incompatible with the image processing device.

One exemplary embodiment image recording media determining method according to this invention includes determining whether to form an image on a transparent sheet of image recording material using an image processing device. The image recording media determining method includes providing the transparent sheet with a code, reading the code, determining whether the read code matches one of a number of stored codes, where each code is associated with a type of material compatible with the image processing device, and forming the image on the image recording material only when the read code matches one of the number of stored odes.

BRIEF DESCRIPTION OF THE DRAWINGS

Other features of the invention will become apparent as the following description proceeds and upon reference to the drawings in which.

DETAILED DESCRIPTION OF PREFERRED EMBODIMENTS

Figure 1:
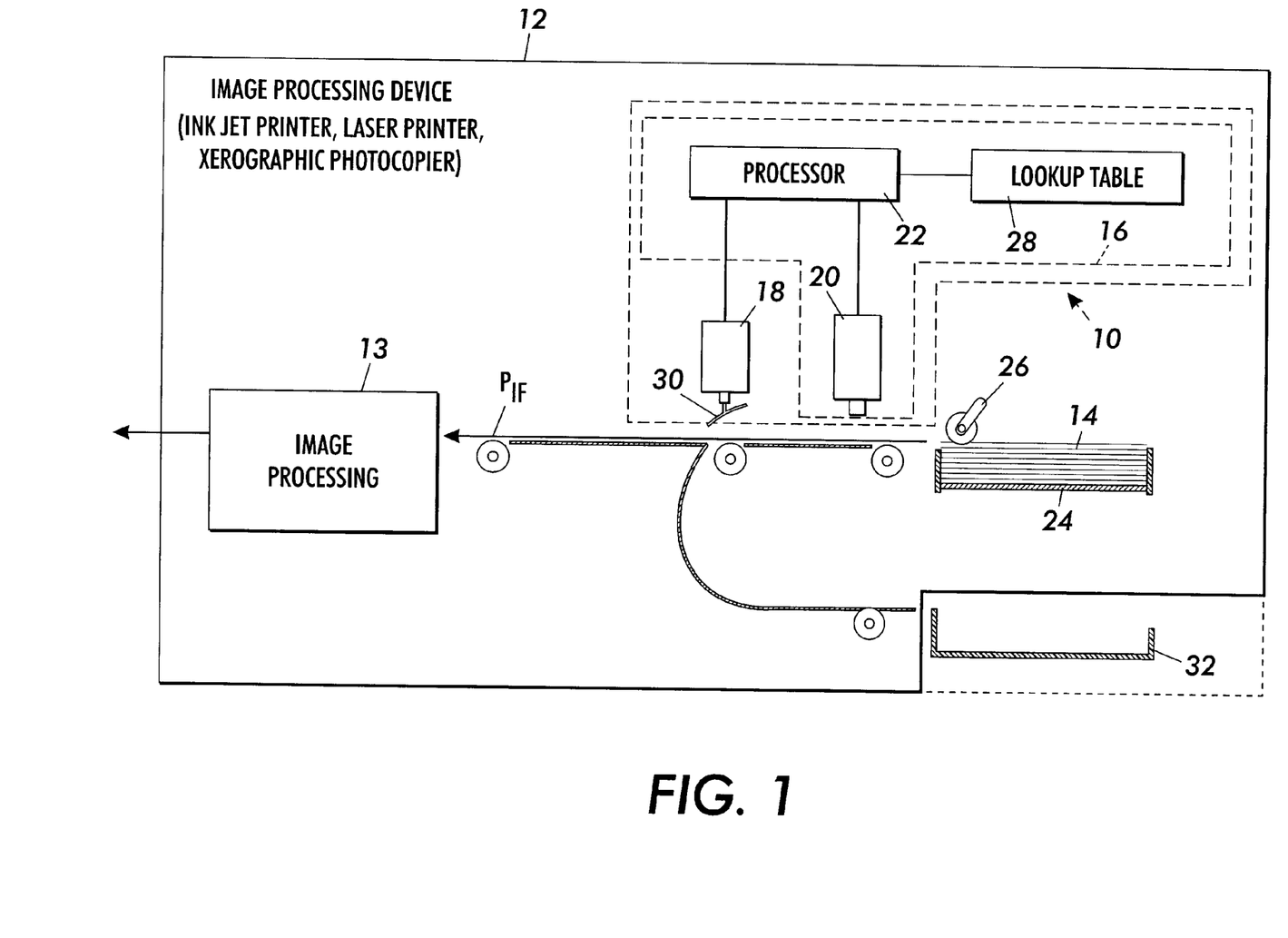
FIG. 1 is a diagrammatic view of a first exemplary embodiment of an image recording media determination apparatus allowing an image to be formed on an image recording media compatible with a conventional image processing device.
Figure 2:
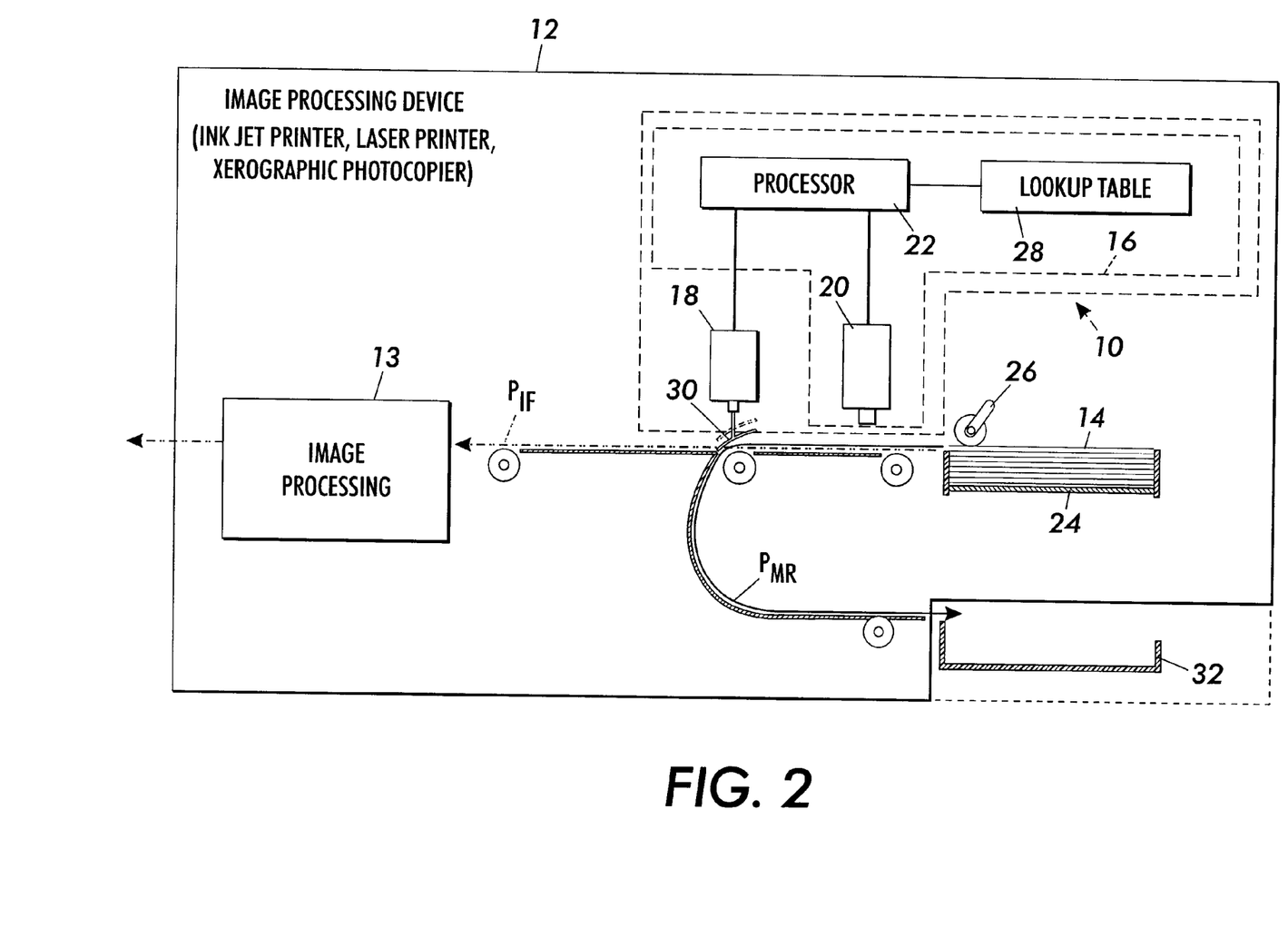
FIG. 2 is a diagrammatic view of the image recording media determination apparatus of FIG. 1 prohibiting formation of the image on the image recording media that is incompatible with the image processing device.

FIGS. 1 and 2 show one exemplary embodiment of an image recording media determination apparatus 10 of the invention. The image recording media determination apparatus 10 is incorporated into a conventional image processing device 12 such as an ink jet printer, a laser printer or a xerographic photocopier that performs an image processing function 13. The image processing device 12 forms an image on a sheet of image recording media 14. One of ordinary skill in the art would appreciate that the sheet of image recording media 14 can be either fabricated from paper, plastic or other material on which images are commonly formed. The plastic sheet of image recording media is commonly known as a "transparency", although transparencies may be formed using other materials.

A related patent application entitled Encoded Sheet Material And Sheet Processing Apparatus Using Encoded Sheet Material, filed on Dec. 20, 1998 in the U.S. Patent and Trademark Office and assigned Ser. No. 09/222,920 describes how encoded sheet material is used with the sheet processing apparatus and is hereby incorporated by reference for all purposes.

The image recording media identification apparatus 10 includes a determination device 16 and a controller device 18. The determination device 16 determines whether the sheet of image recording media 14 is compatible with the image processing device 12. If the sheet of image recording media 14 is compatible with the image processing device 12, an image can be readily formed on the sheet of image recording media 14. The determination device 16 includes a code reader device 20 and a processor 22. As discussed in detail below, each sheet of image recording media 14 is encoded with a code. Thus, the code reader device 20 is operative for reading the code of the sheet of image recording media 14 as the sheet of image recording media 14 is being fed from a media source 24 by a conventional sheet feeder device 26. Although not by way of limitation, the code reader device 20 can be a laser scanner, a reflective optical sensor or a transmissive optical sensor or any other known or later developed device that is capable of reading any known or later developed method for applying or attaching a code to a sheet of image recording media.

If the sheet of image recording media 14 is incompatible with the image processing device 12, an image cannot be properly or securely formed on the sheet of image recording media. For example, in an inkjet printer, the jetted ink is often hydrophobic if an incompatible transparency is transported through the ink jet printer. The hydrophobic ink jetted onto the transparency could form as beads of ink on the transparency instead of being absorbed into the transparency as an image. Thus, the beaded ink could subsequently drip from the transparency, contaminating the internal setting on the transparency as an image components of the thermal ink jet printer.

Figure 3:
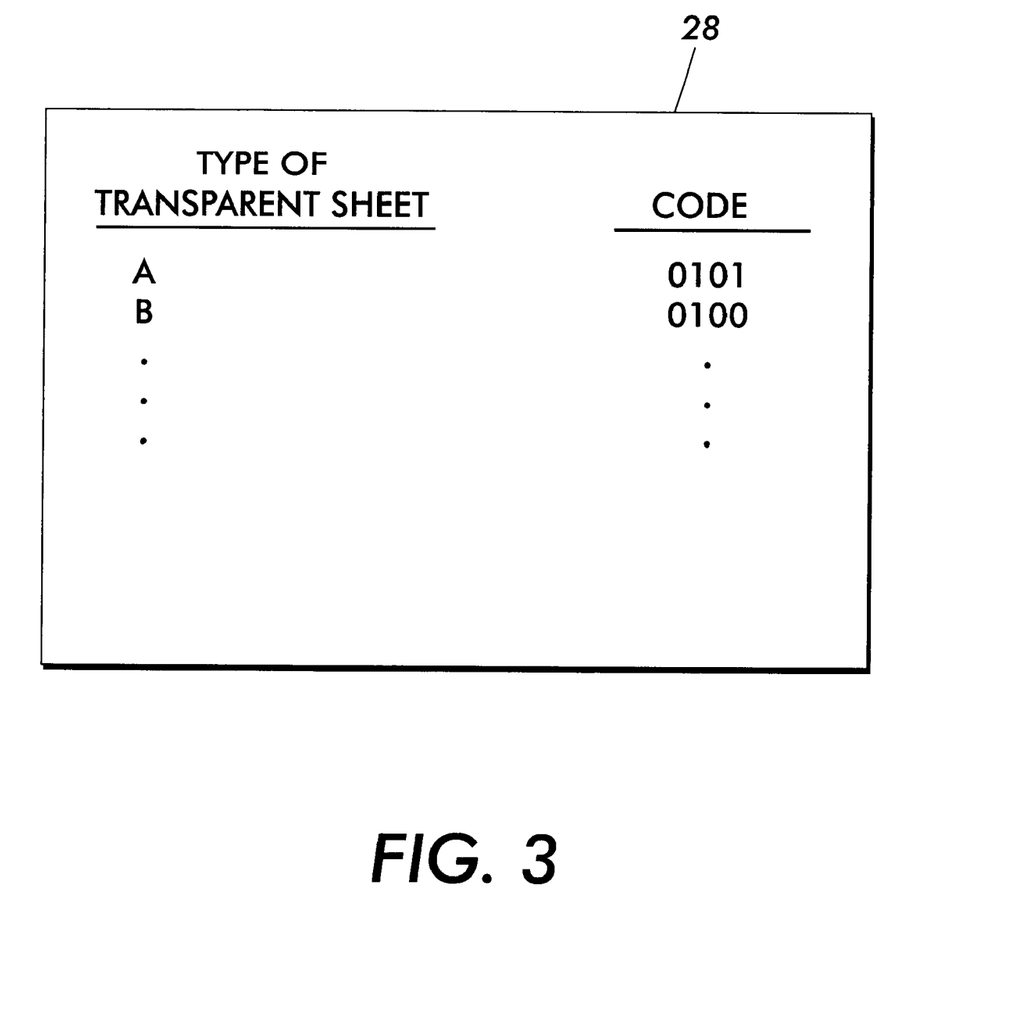
FIG. 3 is a lookup table.

The processor 22 communicates with the code reader device 20 so that the processor 20 can determine if the sheet of encoded image recording media 14 is compatible with the image processing device 12 based upon the read code. As shown in FIGS. 1–3, the determination device 16 also includes a lookup table 28. The lookup table 28 operates in conjunction with the processor 22. As illustrated in FIG. 3, the lookup table 28 contains data that includes types of encoded image recording media represented as types A, B, and etc., and a corresponding code that represents each type of the encoded image recording media. For example, type A of the encoded image recording media is represented by code 0101, while type B of the encoded image recording media is represented by code 0100. When the read code matches the corresponding code contained in the lookup table 28, that type of encoded image recording media is deemed compatible with the image processing device 12.

The controller device 18 communicates with the processor 22. The controller device 18 permits forming the image on the sheet of encoded image recording media 14 by the image processing device 12 when the processor 22 determines that the sheet of encoded image recording media 14 is compatible with the image processing device 12, i.e., that type of image recording media is listed in the lookup table 28. Also, the controller device 18 prohibits forming the image on the sheet of encoded image recording media 14 by the image processing device 12 when the processor 22 determines that the sheet of encoded image recording media 14 is incompatible with the image processing device 12, i.e., that type of image recording media is not listed in the lookup table 28.

The controller device 18 includes a deflector panel 30 that moves to and between a passing position and a blocking position. In FIG. 1, the deflector panel 30 is shown in the passing position. In the passing position, the deflector panel 30 allows the sheet of image recording media 14 to travel along an image forming path represented by arrow $P_{if}$. Thus, the image can be formed on the sheet of image recording media 14 by the image processing device 12 when the processor 22 determines that the sheet of encoded image recording media 14 is compatible with the image processing device 12. In the blocking position shown in FIG. 2, the deflector panel 30 prohibits the sheet of encoded image recording media 14 to travel along the image forming path $P_{if}$. This to prevents forming the image on the sheet of encoded image recording media 14 by the image processing device 12 when the processor 22 determines that the sheet of encoded image recording media is incompatible with the image processing device 12. The deflector panel 30 deflects the sheet of encoded image recording media 14 onto a media rejection path represented by an arrow P The rejected sheet of encoded image recording media 14 is discharged into a media rejection tray 32 which can either be part of the image processing device 12, as illustrated by the dashed line, or a separate component from the image processing device 12. In either regard, the rejected sheet of encoded image recording media 14 is untainted and can be used with another image processing device capable of forming an image on the rejected sheet. One of ordinary skill in the art would appreciate that the image recording media determination apparatus 10 prevents wasting expensive sheets of image recording media.

Figure 4:
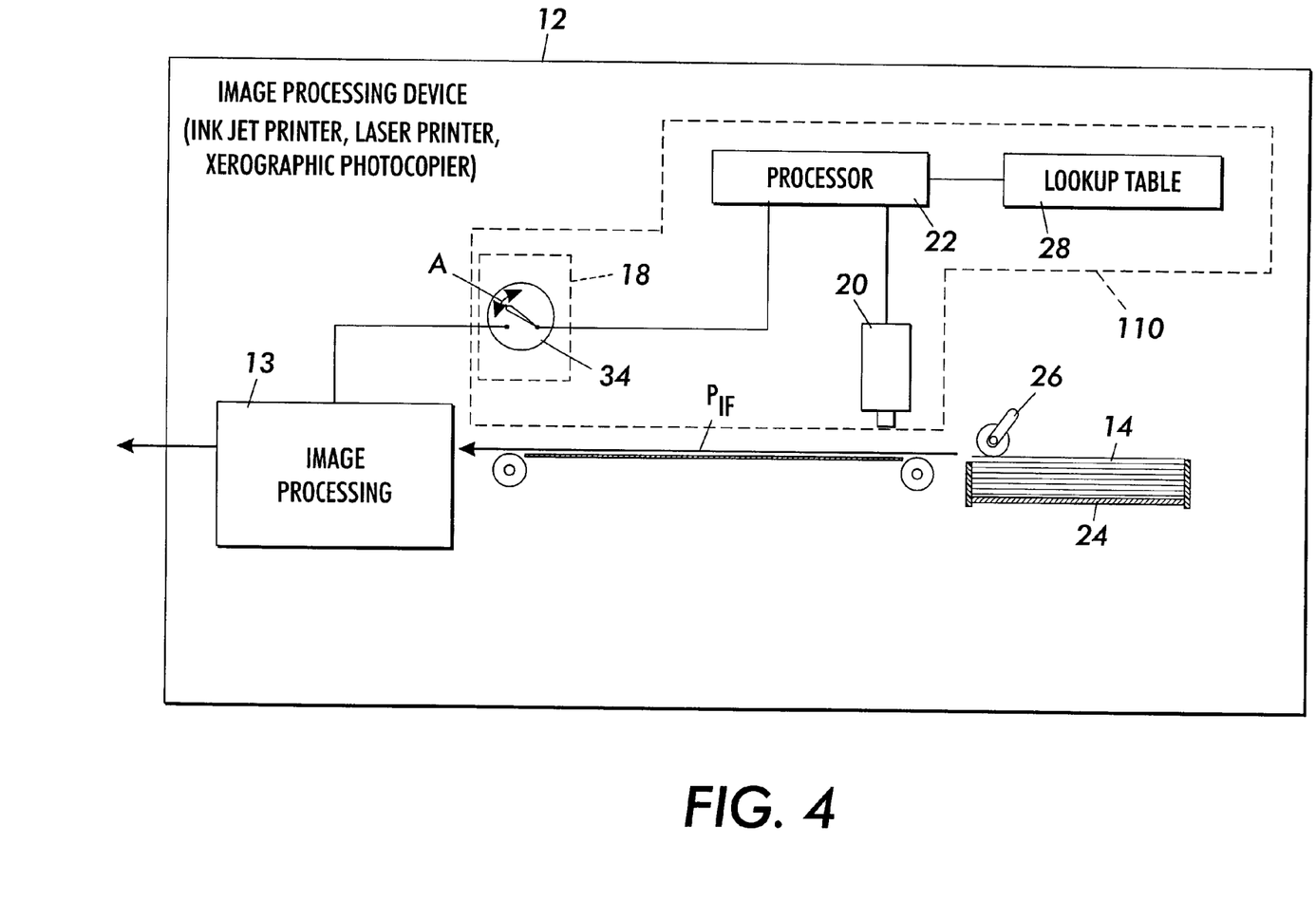
FIG. 4 is a diagrammatic view of a second embodiment of the image recording media determination apparatus incorporated into the conventional image processing device.

FIG. 4 shows another exemplary embodiment of an image recording media determination apparatus 110 of the invention. The image recording media determination apparatus 110 includes the code reader device 20, the processor 22, the lookup table 28 and the controller device 18. However, the controller device 18 includes a switch device 34 that moves to and between a closed state and an opened stated represented by arrow A. In the closed state, the controller device 18 allows the sheet of encoded image recording media 14 to travel along the image forming path $P_{if}$. Thus, an image can be formed on the sheet of encoded image recording media 14 by the image processing device 12 when the processor 22 determines that the sheet of encoded image recording media is compatible with the image processing device 12. In the opened state, the controller device 18 also allows the sheet of encoded image recording media 14 to travel along the image forming path $P_{if}$. However, the controller device 18 disables the image processing capability of the image processing device 12 when the processor 22 determines that the sheet of image recording media is incompatible with the image processing device 12. This prohibits forming the image on the sheet of encoded image recording media 14. Thus, conventional image processing devices 12 can be retrofitted with the image recording media determination device 110.

As illustrated in FIGS. 5–9, the image recording media determination device of the invention can operate with sheets of recording material fabricated from a variety of materials and encoded with a variety of encoding schemes.

Figure 5:
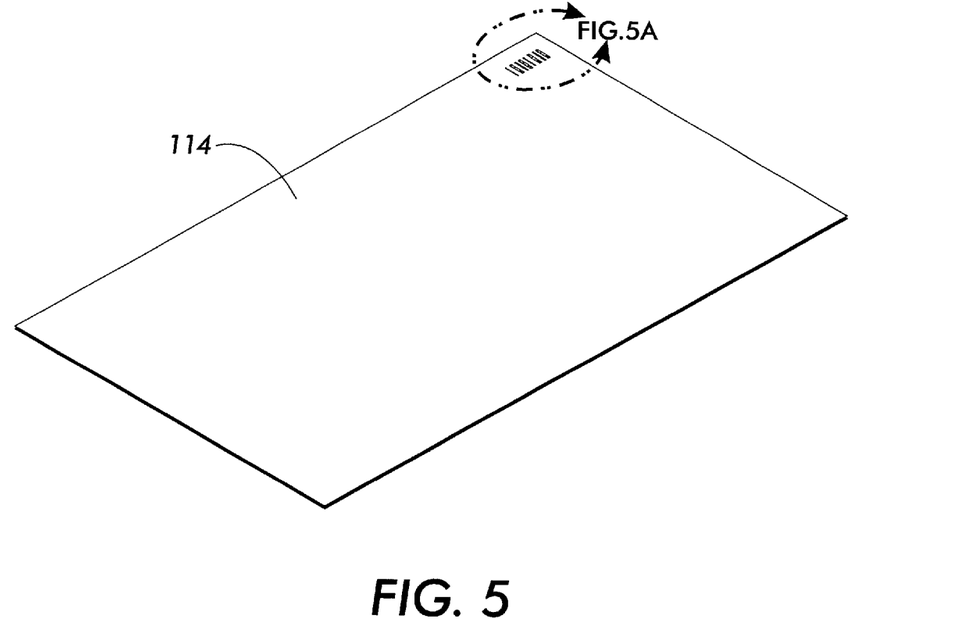
FIG. 5 is a perspective view with an enlarged portion of a transparent sheet of image recording media having a bar code imprinted thereon.
Figure 5A:
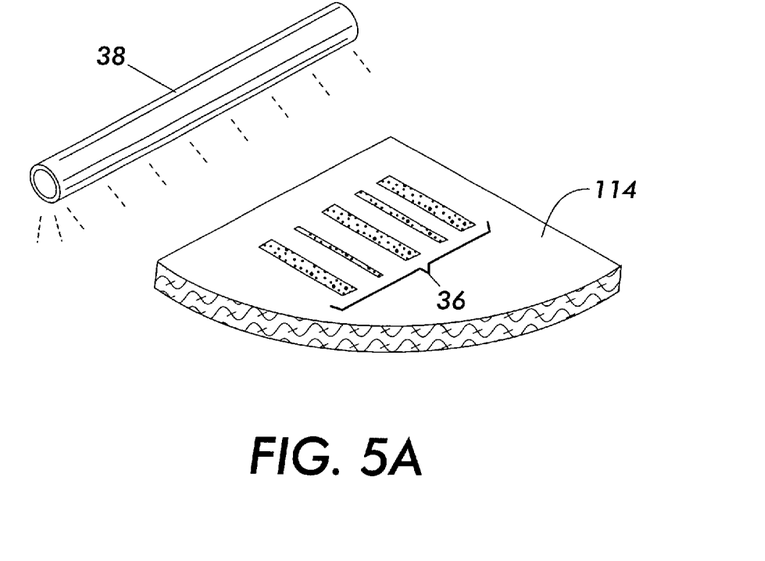

In FIG. 5, a sheet of image recording media 114 is fabricated from paper material. The sheet of image recording media 114 includes indicia that is arranged on the sheet in a form of a code. By way of example, the indicia arranged on the sheet of image recording media 114 is a standard bar code 36 that is imprinted by an invisible ink. When exposed to an ultraviolet light source 38, the bar code becomes visible.

Figure 6:
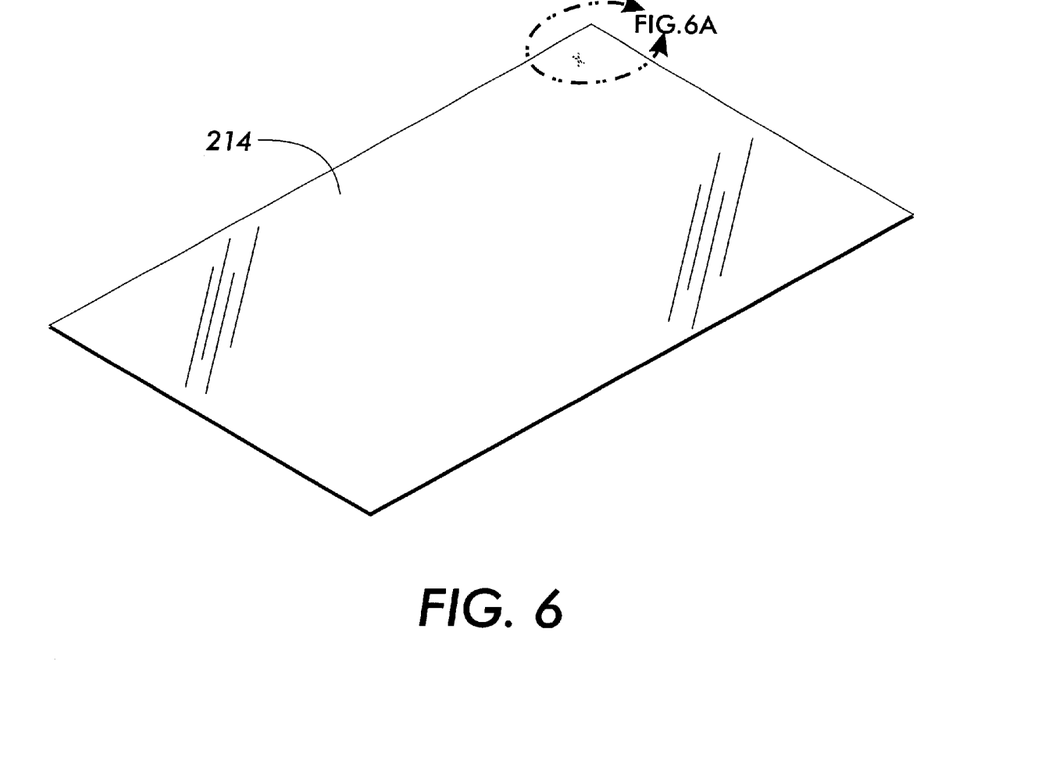
FIG. 6 is a perspective view with an enlarged portion of a transparent sheet of image recording media having a code in a form of a digitized X-shaped pattern formed thereon.
Figure 6A:
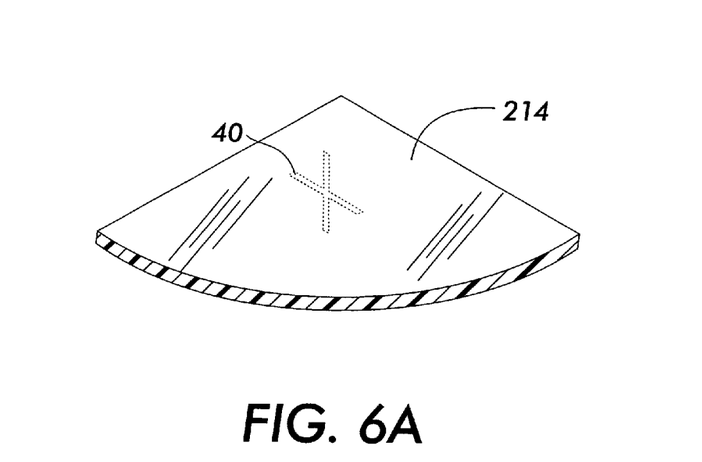

In FIG. 6, a sheet of image recording media 214 is a transparency fabricated from a clear plastic material. By way of example, the indicia is formed on the sheet of image recording media 214 by a visible ink in a form of a digitized X-shaped pattern 40.

Figure 7:
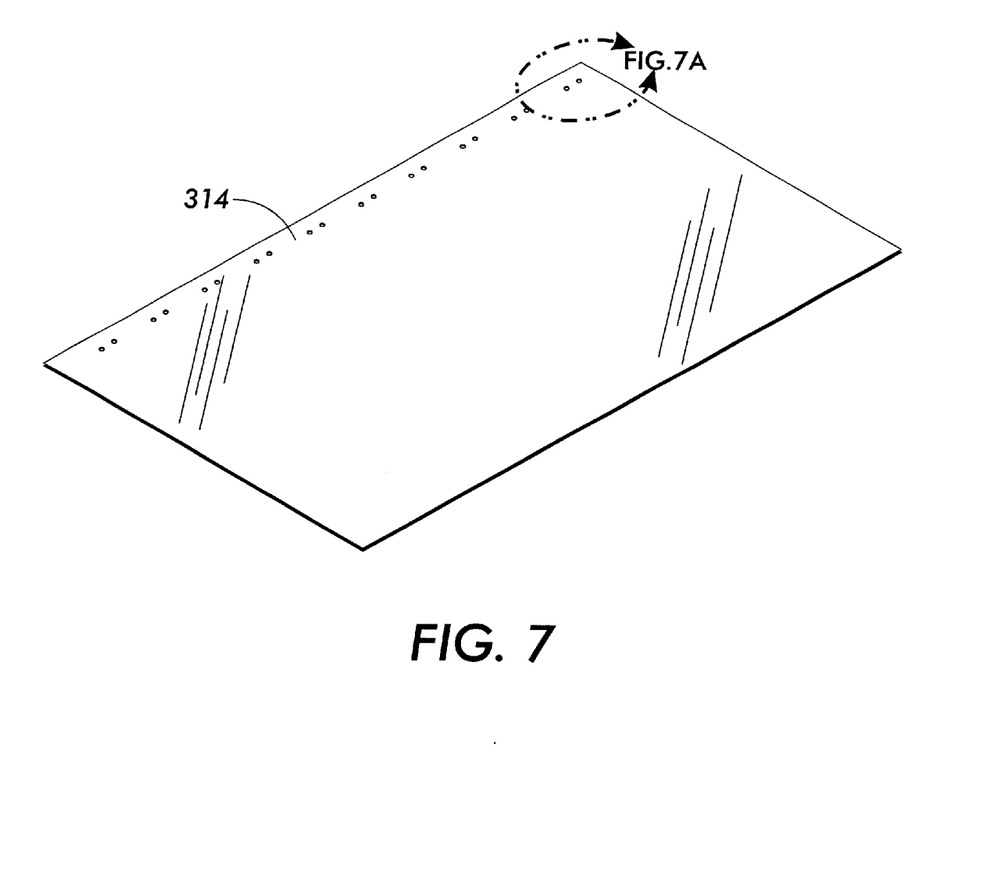
FIG. 7 is a perspective view with an enlarged portion of a transparent sheet of image recording media having a code in a form of a pattern of holes formed in the sheet.
Figure 7A:
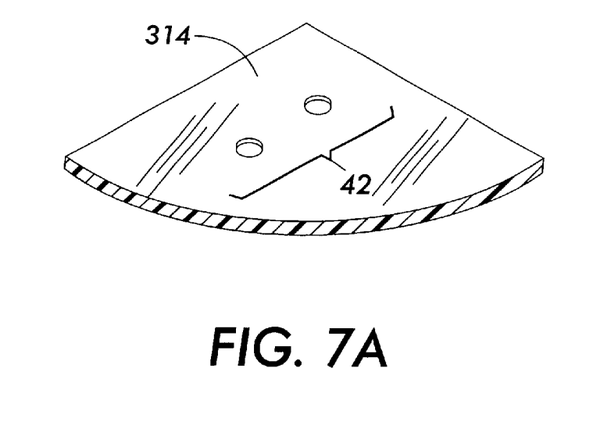

In FIG. 7, a sheet of image recording media 314 is also a transparency. However, the code is a pattern of holes 42 formed through the transparency along a margin portion of the sheet.

Figure 8:
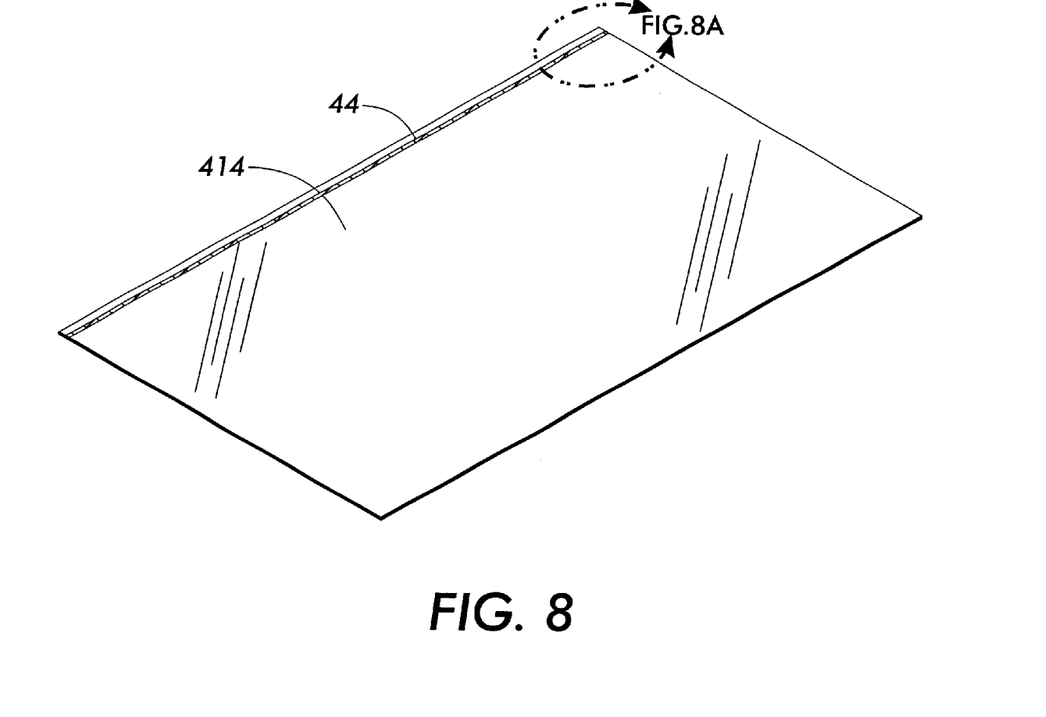
FIG. 8 is a perspective view with an enlarged portion of a transparent sheet of image recording media having a code in a form of a colored stripe that contains a pattern of transparent voids.
Figure 8A:
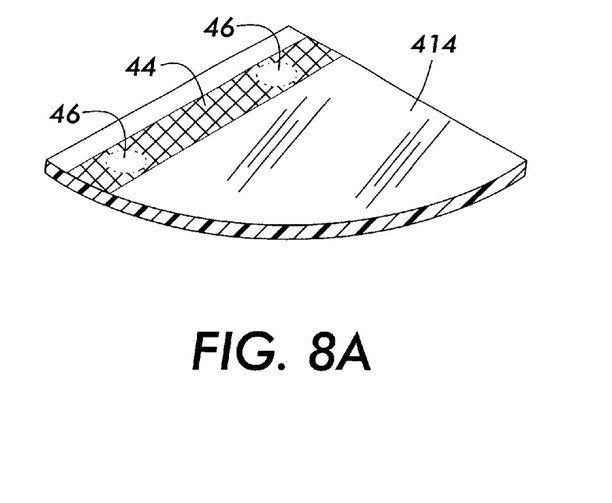

In FIG. 8, a sheet of image recording media 414 is a transparency. The sheet of image recording media 414 includes a colored stripe 44 that extends along a margin portion of the sheet. The colored stripe 44 contains a pattern of transparent voids 46 spaced apart from one another in a form of a code.

Figure 9:
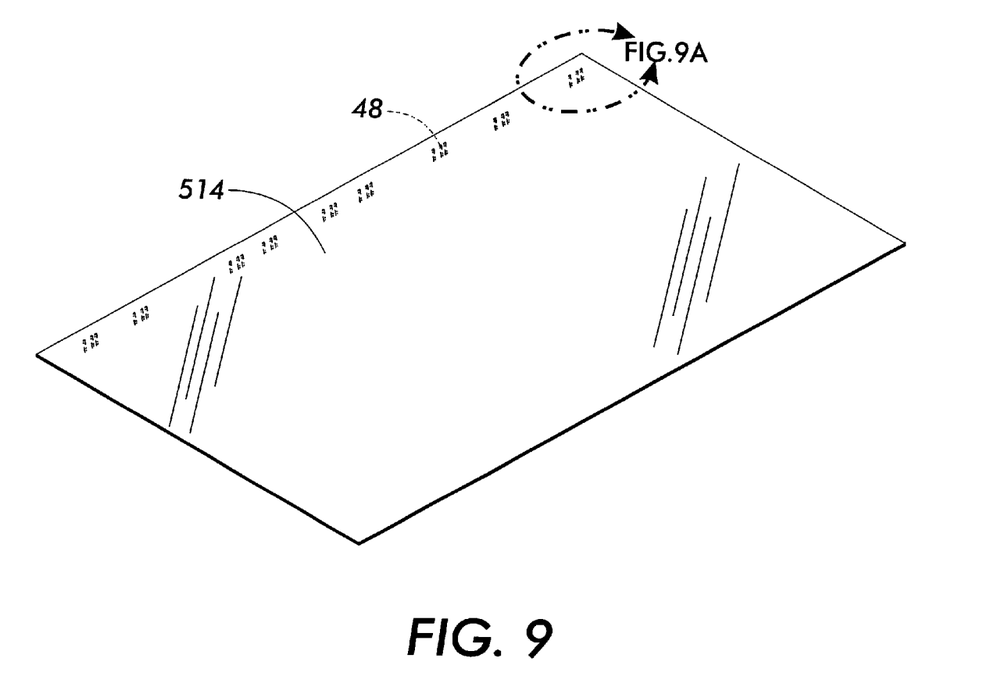
FIG. 9 is a perspective view with an enlarged portion of a transparent sheet of image recording media having a code in a form of a pattern of glyphs formed on the sheet.
Figure 9A:
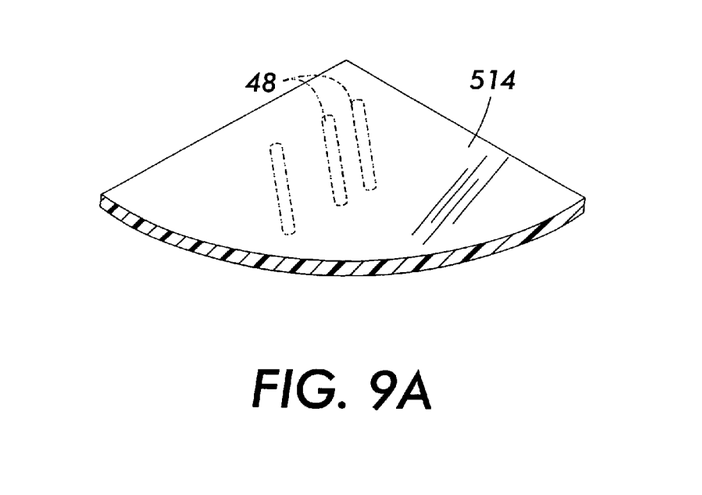

In FIG. 9, a sheet of image recording media 514 is a transparency and includes a pattern of glyphs 48 which is used as a code. Although not by way of limitation, the glyphs 48 extending longitudinally and at an angle relative to a margin of the transparency.

Figure 10:
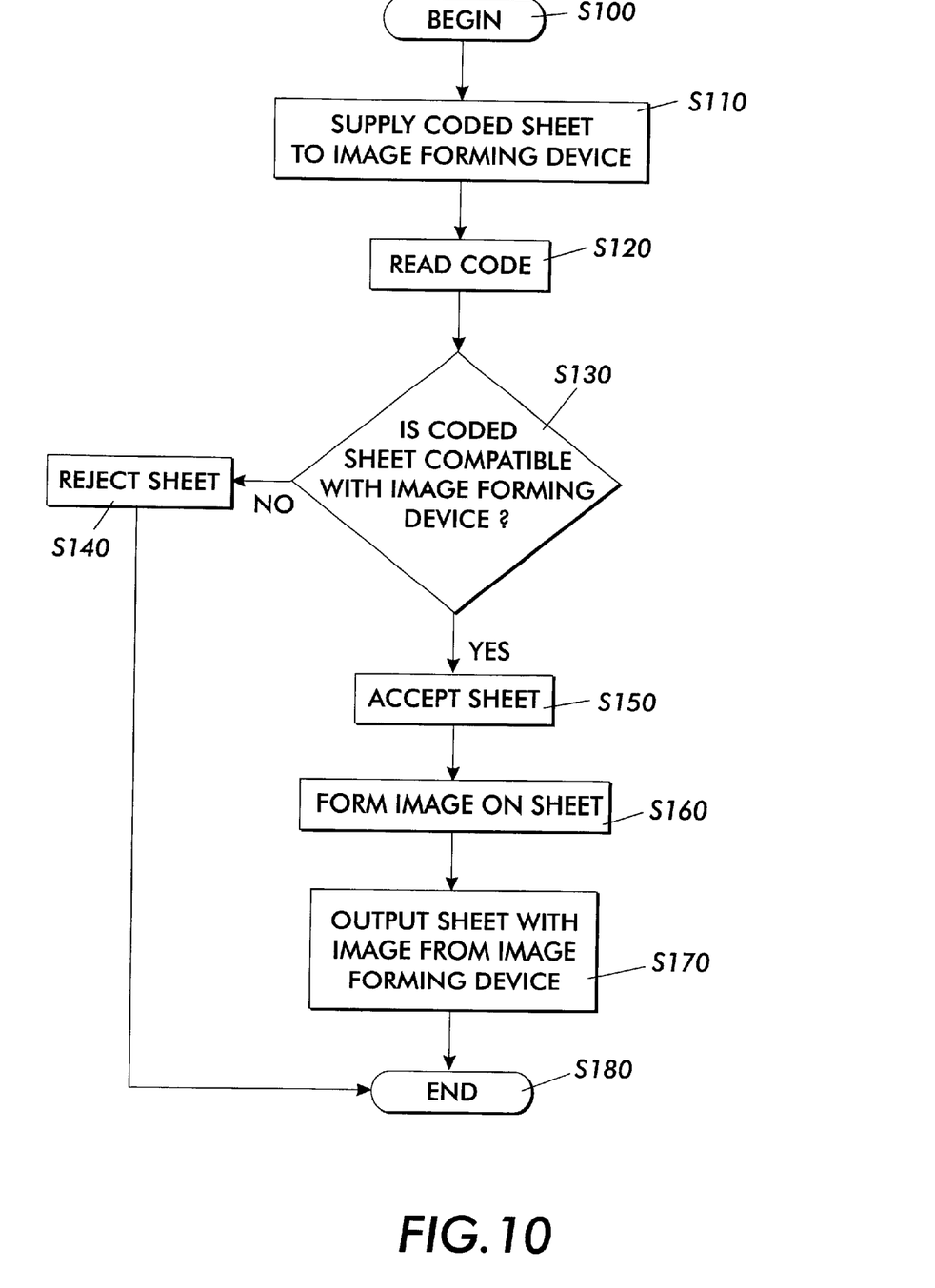
FIG. 10 is a flowchart outlining one exemplary embodiment of an image recording media determining method according to this invention.

FIG. 10 is a flow chart outlining one exemplary embodiment of an image recording media determining method according to this invention. As shown in FIG. 10, control begins in step S100, and continues to step S110. In step S110, a sheet of a recording media having a code formed on or in the sheet is supplied to an image forming device or the like. Then in step S120, the code is read.

Next, in step S130, the read code is analyzed to determine if the supplied sheet of image recording media is compatible with the image forming device. If not, control continues to step S140. Otherwise, if the sheet is compatible, control jumps to step S150. In step S140, the supplied sheet of image recording media is rejected. Control then jumps to step S180.

In contrast in step S150, the supplied sheet of image recording media is accepted. Then, in step S160, an image is formed on the supplied sheet of image recording media. Next, in step S170, the sheet carrying the image is output from the image forming device. Control the continues to step S180 where the process ends.

While this invention has been described in conjunction with the specific embodiments outlined above, it is evident that many alternatives, modifications and variations will be apparent to those skilled in the art. Accordingly, the preferred embodiments of the invention, set forth above, are intended to be illustrative, not limiting. Various changes may be made without departing from the spirit and scope of the invention.

What is claimed is:

1. An image recording media determination system for use with an image processing device operative for forming an image on a sheet of an image recording media fed from a media source, the image recording media determination system comprising:

a determination device that determines whether the sheet of image recording media is compatible with the image processing device; and a controller device in communication with the determination device, wherein the controller device controls the image processing device to form the image on the sheet of image recording media by the image processing device in response to the determination device determining that the sheet of image recording media is compatible with the image processing device, and to prevent the image processing device from forming the image on the sheet of image recording media in response to the determination device determining that the sheet of image recording media is incompatible with the image processing device.

2. An image recording media determination system according to claim 1, wherein the determination device determines whether the sheet of image recording media is compatible with the image processing device as the sheet of image recording media is fed from the media source.

3. An image recording media determination system according to claim 1, wherein:

the sheet of image recording media includes indicia arranged on the sheet of image recording media, in a form of a code; and the determination device includes:

a processor, and a code reader device, connected to the processor, that reads the code, wherein the processor determines whether the coded sheet of image recording media is compatible with the image processing device based upon the read code.

4. An image recording media determination system according to claim 3, wherein the sheet of image recording media is fabricated from one of a paper material and a transparency material.

5. An image recording media determination system according to claim 3, wherein the indicia arranged in the form of code are made by one of visible ink and invisible ink.

6. An image recording media determination system according to claim 3, wherein the indicia arranged in the form of code is one of a bar code, a pattern of holes, a pattern of glyphs, a colored stripe containing a pattern of transparent voids, and a digitized X-shaped pattern.

7. An image recording media determination system according to claim 3, wherein the determination device includes a lookup table in communication with the processor and containing data including at least one type of image recording media and a corresponding code representing whether the at least one type of image recording media is compatible with the image processing device.

8. An image recording media determination system according to claim 3, wherein the controller device is connected to the processor and includes a deflector panel that moves to a passing position that allows the sheet of the image recording media to travel along an image processing path in order to form the image on the sheet of image recording media by the image processing device in response to the determination device determining that the sheet of image recording media is compatible with the image processing device.

9. An image recording media determination system according to claim 3, wherein the controller device is connected to the processor and includes a switch device that moves to a closed state that allows the sheet of the image recording media to travel along an image processing path in order to form the image on the sheet of image recording media by the image processing device in response to the determination device determining that the sheet of image recording media is compatible with the image processing device.

10. An image recording media determination system according to claim 1, wherein the image processing device is one of an ink jet printer, a laser printer and a xerographic photocopier.

11. An image recording media determination apparatus for use with an image processing device operative to form an image on sheet of image recording media encoded with a code and fed from a media source, the image recording media determination apparatus comprising:

a code reader device that reads the code of sheet of encoded image recording media as the sheet of encoded image recording media is fed from the media source;

a processor in communication with the code reader device that determines if the sheet of encoded image recording media is compatible with the image processing device based upon the read code; and a controller in communication with the processor;

wherein the controller permits formation of the image on the sheet of encoded image recording media by the image processing device in response to the processor determining that the sheet of encoded image recording media is compatible with the image processing device, and prohibits formation of the image on the sheet of encoded image recording media by the image processing device in response to the processor determining that the sheet of encoded image recording media is incompatible with the image processing device.

12. An image recording media determination apparatus according to claim 11, further comprising:

a lookup table operative in conjunction with the processor and containing data identifying at least one type of encoded image recording media and a corresponding code representing the at least one type of encoded image recording media, wherein, in response to the read code matching the corresponding code, the at least one type of encoded image recording media is deemed compatible with the image processing device.

13. An image recording media determination apparatus according to claim 12, wherein the controller includes a deflector panel that moves to a passing position that allows the sheet of the encoded image recording media to travel along an image forming path so that the image can be formed on the sheet of encoded image recording media by the image processing device in response to the processor determining that the sheet of encoded image recording media is compatible with the image processing device.

14. An image recording media determination apparatus according to claim 12, wherein the controller includes a switch device that moves to a closed state that allows the sheet of the encoded image recording media to travel along an image forming path in order to form the image on the sheet of encoded image recording media by the image processing device in response to the processor determining that the sheet of encoded image recording media is compatible with the image processing device.

15. A method for determining whether to form an image using an image forming device on a sheet of image recording media having a code, the method comprising:

supplying the sheet of image recording material to the image forming device;

reading the code on the sheet of image recording material;

determining whether the sheet of image recording material is compatible with the image forming device based on the code; and forming the image on the sheet of image recording material if the image recording material is compatible with the image forming device.

16. An image recording media determination system according to claim 3, wherein the controller device is connected to the processor and includes a deflector panel that moves to a blocking position that prohibits the sheet of image recording media from traveling along the image processing path to prevent forming the image on the sheet of image recording media by the image processing device in response to the determination device determining that the sheet of image recording media is incompatible with the image processing device.

17. An image recording media determination system according to claim 3, wherein the controller device is connected to the processor and includes a switch device that moves to an opened state that allows the sheet of image recording media to travel along the image processing path while prohibiting formation of the image on the sheet of image recording media by the image processing device in response to the determination device determining that the sheet of image recording media is incompatible with the image processing device.

18. An image recording media determination apparatus according to claim 12, wherein the controller includes a deflector panel that moves to a blocking position that prohibits the sheet of encoded image recording media from traveling along the image forming path to prevent forming the image on the sheet of encoded image recording media by the image processing device in response to the processor determining that the sheet of encoded image recording media is incompatible with the image processing device.

19. An image recording media determination apparatus according to claim 12, wherein the controller includes a switch device that moves to an opened state that allows the sheet of the encoded image recording media to travel along the image forming path while prohibiting formation of the image on the sheet of encoded image recording media by the image processing device in response to the processor determining that the sheet of encoded image recording media is incompatible with the image processing device.

20. An image recording media determination system according to claim 1, wherein the image processing device determines whether the at least one type of image recording media is compatible with a particular process for forming an image by the image processing device.

* * * * *